(12) United States Patent
Khalaf et al.

(10) Patent No.: US 9,550,304 B2
(45) Date of Patent: Jan. 24, 2017

(54) PROCESS FOR RECYCLING MULTICOMPARTMENT UNIT DOSE ARTICLES

(71) Applicant: The Procter & Gamble Company, Cincinnati, OH (US)

(72) Inventors: Suzanne Khalaf, Brussels (BE); Christopher Krasen, Cincinnati, OH (US); Dan Edward Taylor, Monroe, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 285 days.

(21) Appl. No.: 14/108,385

(22) Filed: Dec. 17, 2013

(65) Prior Publication Data

US 2014/0190323 A1     Jul. 10, 2014

Related U.S. Application Data

(60) Provisional application No. 61/749,551, filed on Jan. 7, 2013.

(51) Int. Cl.

| B26D 3/12 | (2006.01) |
| B29B 17/02 | (2006.01) |
| B26D 1/02 | (2006.01) |
| B26D 1/143 | (2006.01) |
| B26D 7/06 | (2006.01) |
| B29L 31/00 | (2006.01) |
| B29K 29/00 | (2006.01) |

(52) U.S. Cl.
CPC . *B26D 3/12* (2013.01); *B26D 1/02* (2013.01); *B26D 1/143* (2013.01); *B26D 7/0625* (2013.01); *B29B 17/02* (2013.01); *B29B 2017/0293* (2013.01); *B29K 2029/04* (2013.01); *B29K 2995/0062* (2013.01); *B29L 2031/7128* (2013.01); *Y02W 30/622* (2015.05); *Y10T 83/04* (2015.04); *Y10T 83/202* (2015.04)

(58) Field of Classification Search
CPC ... B26D 3/12; B29B 17/02; B29B 2017/0293; Y02W 30/622; Y10T 83/04; Y10T 83/202; B29K 2029/04; B29L 2031/7128
USPC ............ 53/552, 75, 381.2; 83/83, 27, 54, 13
See application file for complete search history.

(56) References Cited

U.S. PATENT DOCUMENTS

| 2,223,467 A * | 12/1940 | Spang ...................... B26D 3/12 |
| | | 452/143 |
| 5,211,711 A * | 5/1993 | Marco ...................... B26D 3/12 |
| | | 206/150 |

(Continued)

FOREIGN PATENT DOCUMENTS

| EP | 1462513 A1 | 9/2001 |
| GB | 2367557 A | 4/2002 |

(Continued)

OTHER PUBLICATIONS

PCT Search Report; PCT/US2014/010272: Dated Jan. 6, 2014; 14 pages.

*Primary Examiner* — Omar Flores Sanchez
(74) *Attorney, Agent, or Firm* — Gregory S. Darley-Emerson; Leonard W. Lewis; Steven W. Miller

(57) ABSTRACT

Process and apparatus for recycling multi-compartment unit dose articles to avoid significant cross-contamination between the contents of the individual compartments.

19 Claims, 6 Drawing Sheets

(56) References Cited

U.S. PATENT DOCUMENTS

| | | | | |
|---|---|---|---|---|
| 7,404,708 B2* | 7/2008 | Sowden | ............... | A61J 3/10 |
| | | | | 425/112 |
| 2005/0074514 A1* | 4/2005 | Anderson | ............ | A61J 3/005 |
| | | | | 425/461 |
| 2015/0298844 A1* | 10/2015 | Burattini | ............. | B65B 61/02 |
| | | | | 53/131.5 |

FOREIGN PATENT DOCUMENTS

| | | |
|---|---|---|
| WO | WO02/26896 A2 | 4/2002 |
| WO | WO2004/022447 A1 | 3/2004 |
| WO | WO 2011/023941 A2 | 3/2011 |

* cited by examiner

PROCESS FOR RECYCLING MULTICOMPARTMENT UNIT DOSE ARTICLES

FIELD OF THE INVENTION

Processes and apparatus for recycling multi-compartment unit dose articles, whereby a compartment is perforated without perforating another compartment, can reduce cross-contamination when the compartment contents are recycled into further compositions.

BACKGROUND OF THE INVENTION

Unit dose articles are preferred by consumers because of their ease of use. Consumers are demanding multiple benefits from these unit dose articles. Examples include laundry unit dose articles which provide excellent cleaning in addition to excellent fabric care benefits. Such benefits may include: softness, reduced fabric wrinkles, less mechanical damage during washing, less pills/fuzz, and less colour transfer or fading. Other examples include automatic dishwashing unit dose articles which provide excellent cleaning benefits, such as stain removal, in addition to excellent rinsing.

However, meeting multiple needs often results in the unit dose article requiring ingredients which are incompatible or unstable in the same composition, such as cationic fabric softening agents in combination with anionic cleaning surfactants, or hueing dyes having an intense colour which would over-power the dye of the desired aesthetics colour, or rinse additives to be released in a cycle after the wash ingredients. Consequently, it is desirable to place such incompatible ingredients in separate compartments of the unit dose article.

Such multi-compartment unit dose articles create additional process challenges. While often being challenging to make, they are also challenging to recycle. The need to recycle multi-compartment unit dose articles may arise because of excess production, from trade-returns, and the like.

Single compartment unit dose articles can be recycled by shredding or crushing the unit dose article to release the contents. For example, WO2004/022447 discloses a process for reclaiming the contents by breaking the unit dose articles using breaker bars and paddles. Another process for recycling single compartment unit dose articles can be found in EP 1 462 513, which discloses a process for recycling unit dose article contents, by dissolving the encapsulating material and converting the contents into a solid or semi-solid.

As mentioned earlier, multi-compartment unit dose articles typically contain incompatible ingredients. Currently, such unit dose articles are scrapped, since existing recycling technologies, for instance as described above, combine the contents of the different compartments, and hence combine incompatible ingredients.

Consequently, a need remains for a means to recycle multi-compartment unit dose articles, while avoiding significant cross-contamination between the contents of the individual compartments.

SUMMARY OF THE INVENTION

The present invention relates to a process for recycling the contents of at least one compartment of a multi-compartment unit dose article (1), having a first compartment (2), and at least a second compartment (3), formed by encapsulating the contents of the compartments with a water-soluble film, characterized in that the process comprises: orienting the unit dose article (1), wherein the unit dose article (1) is oriented relative to a perforating device (10), such that at least a portion of the first compartment (2) faces the perforating device (10); and opening the first compartment (2), wherein the water-soluble film encapsulating the contents of the first compartment (2) is perforated by the perforating device (10) to form a perforated compartment, without perforating any further compartment of the unit dose article (1).

The present invention also relates to partially recycled compositions formed by combining the extracted contents of the unit dose article with additional ingredients, and unit does articles, formed from such partially recycled compositions.

The present invention also relates to an apparatus for recycling the contents of at least one compartment of a multi-compartment unit dose article, comprising: a means of orienting the multi-compartment unit dose article relative to the perforating device, such that the first compartment faces the perforating device; and a perforating device for opening the first compartment.

DETAILED DESCRIPTION OF THE DRAWINGS

Figure 1:
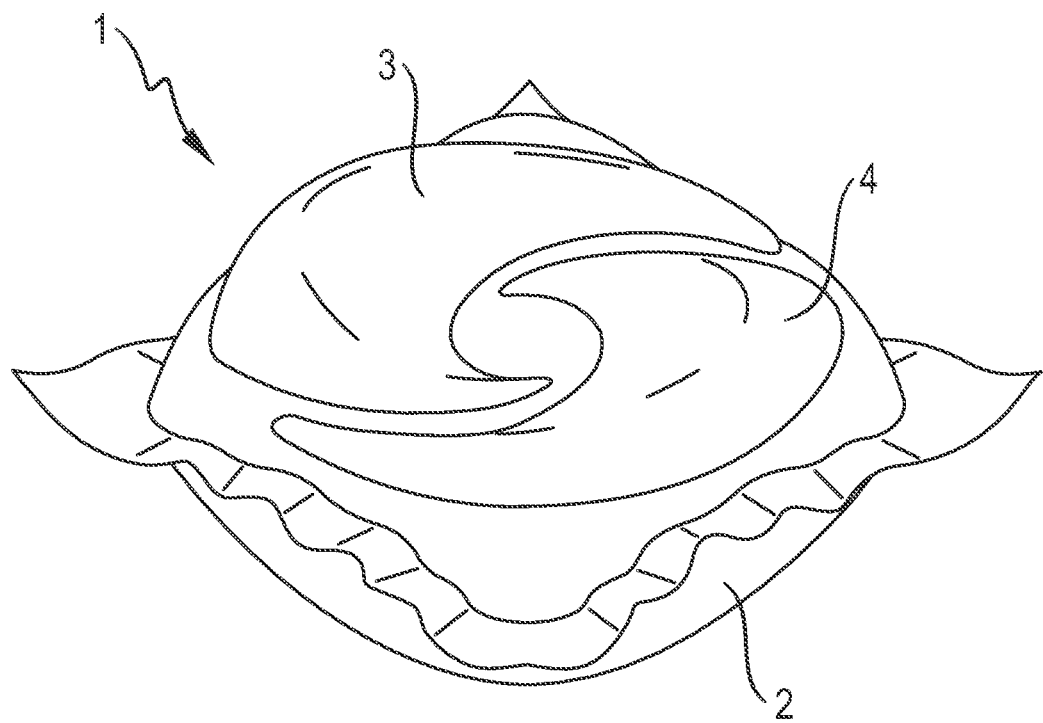
FIG. 1 illustrates a multicompartment unit dose article.

FIG. 1 illustrates a multicompartment unit dose article (1), having a first compartment (2), a second compartment (3) and a third compartment (4). At least part of the contents of the first compartment (2) can be emptied and subsequently recycled using the process described herein.

Figure 2:
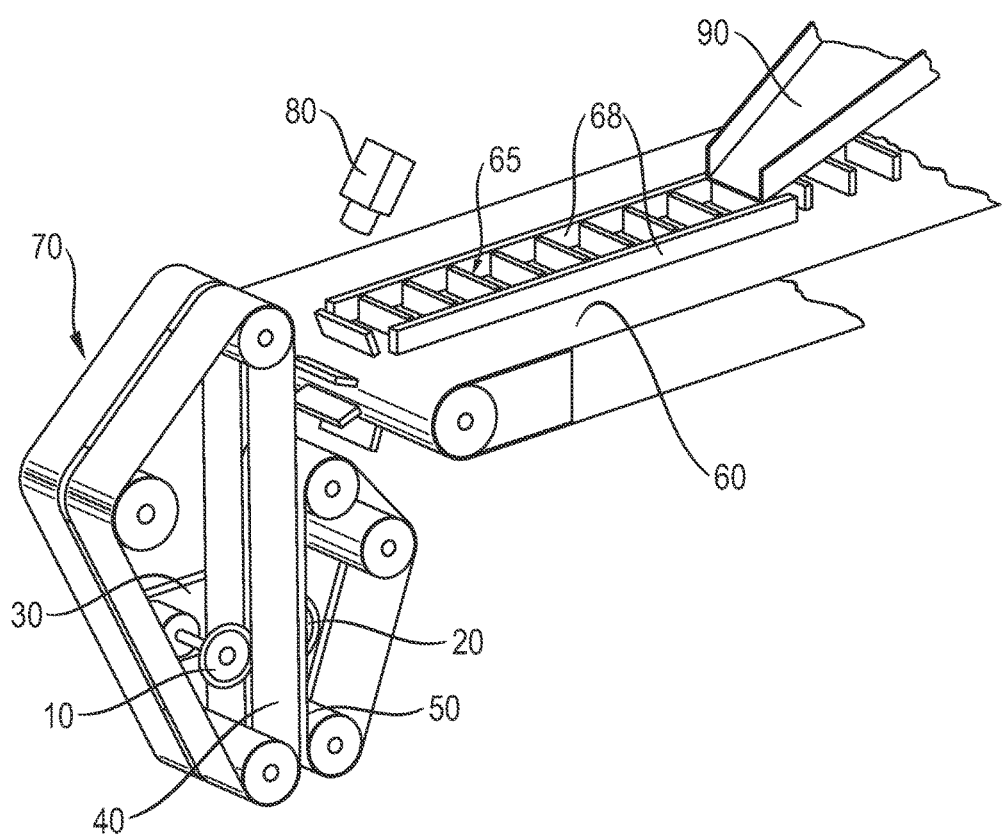
FIG. 2 illustrates an apparatus for use in the process described herein.

FIG. 2 illustrates an apparatus for use in the process described herein, wherein the apparatus comprises a first perforating device (10), a second perforating device (20), being mounted on a block (30) which is moveable in the cross-direction to the flow of the unit dose articles (1). Depending on which perforating device is facing the first compartment, the block (30) is moved, such that the relevant perforating device (the first perforating device (10) in this case) passes through a gap in the transport belt (40) and intersects with the first compartment (2) of the unit dose article (1). In the present embodiment, both perforating devices are rotating circular blades. During the opening step, a compression force is applied to the unit dose article (1) by a conveyor (70) which comprises two sets of opposing transport belts (40) and (50). An inspection camera (80) is positioned to view between the first conveyor (60) which comprises lugs (65) for spacing the unit dose articles (1), and the second conveyor (70), positioned at right angles to the first conveyor (60). To prevent the unit dose articles from falling out of the pockets formed by the lugs (65), optional stationary side walls (68) are positioned on either side of the lugs. The unit dose articles (1) are fed to the first conveyor (60) from a hopper (not shown), via a chute (90).

Figure 3:
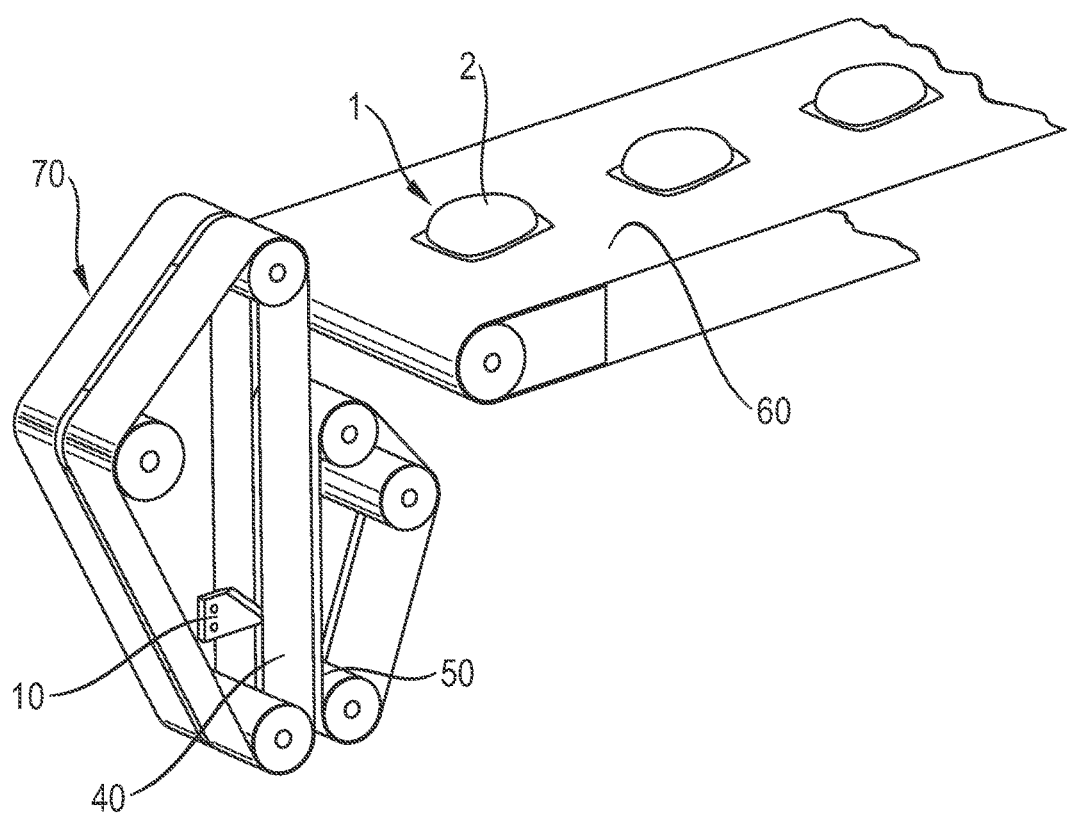
FIG. 3 illustrates a similar apparatus to that shown of FIG. 2.

FIG. 3 illustrates a similar apparatus to that shown if FIG. 1, with the following differences: the unit dose articles are prepositioned into a flat first conveyor (60) using a robotic device (not shown) which also orients the unit dose articles (1) with the first compartment (2) facing upwards; and the perforating device (10) is a stationary blade.

Figure 4:
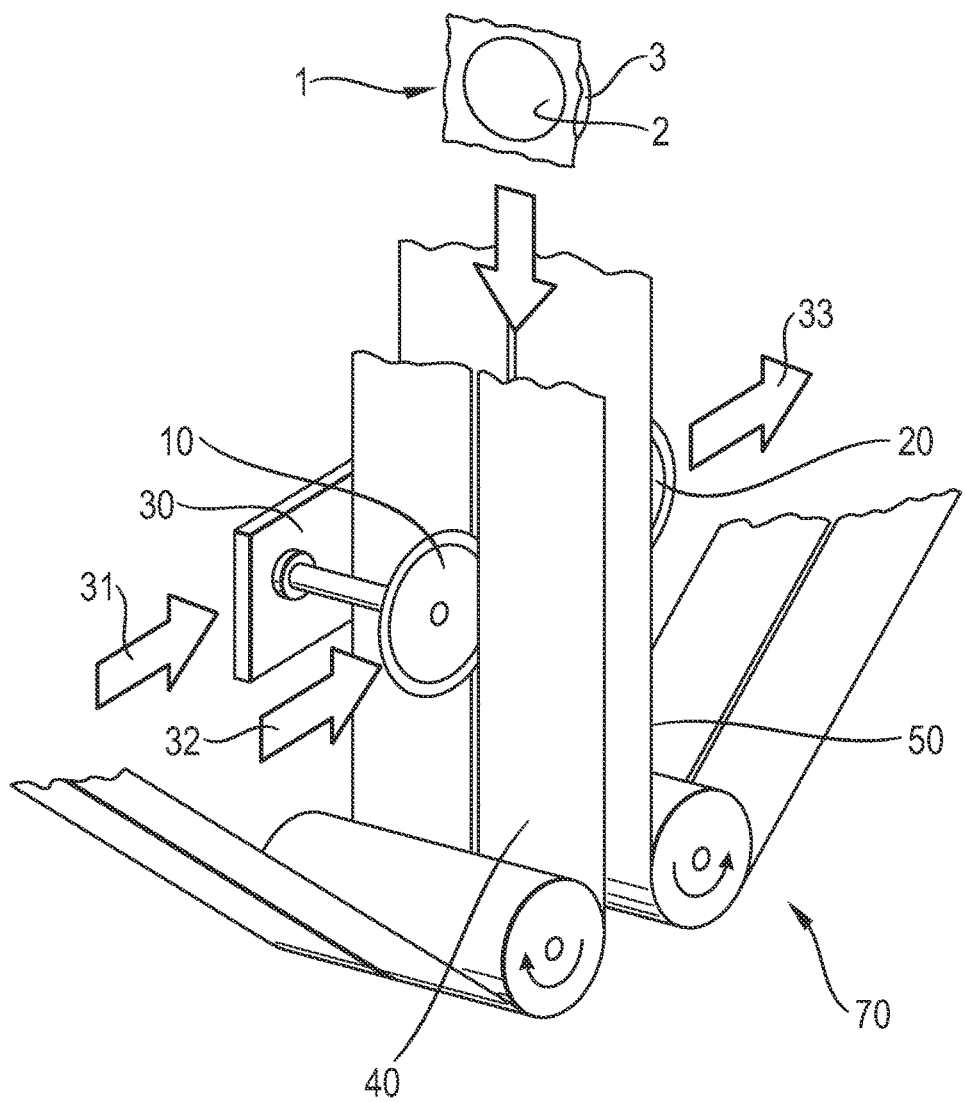
FIG. 4 illustrates part of the apparatus of FIG. 2.

FIG. 4 illustrates part of the apparatus of FIG. 2. In the embodiment shown, the block (30) is moved in the cross direction, shown by the arrows (31), (32), and (33), such that the first perforating device (10), consisting of a clockwise rotating circular blade, intersects with the first compartment (2) of the unit dose article (1). Since both the first perforating device (10) and the second perforating device (20) are mounted on the same block (30), the second perforating device (20) is moved away from the unit dose article (1) at the same time as the first perforating device (10) is positioned to intersect the unit dose article (1).

Figure 5:
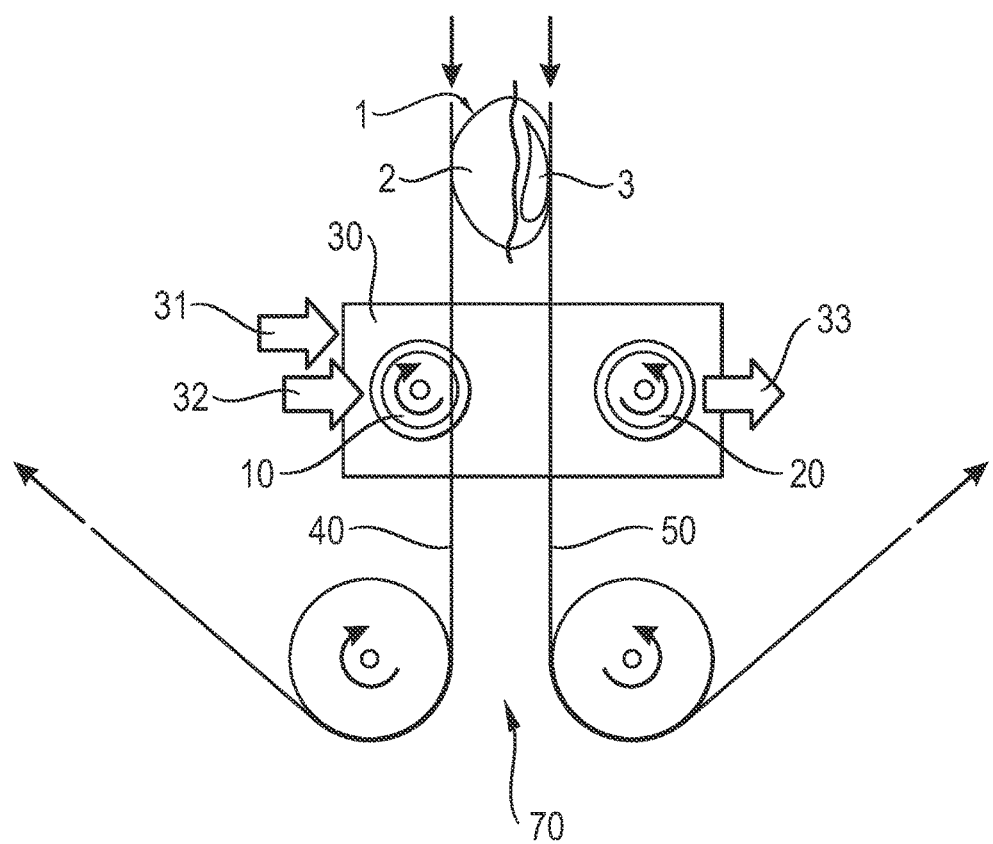
FIG. 5 illustrates the same part of the apparatus of FIG. 2, viewed in the cross-direction.

FIG. 5 illustrates the same part of the apparatus of FIG. 2, viewed in the cross-direction.

Figure 6:
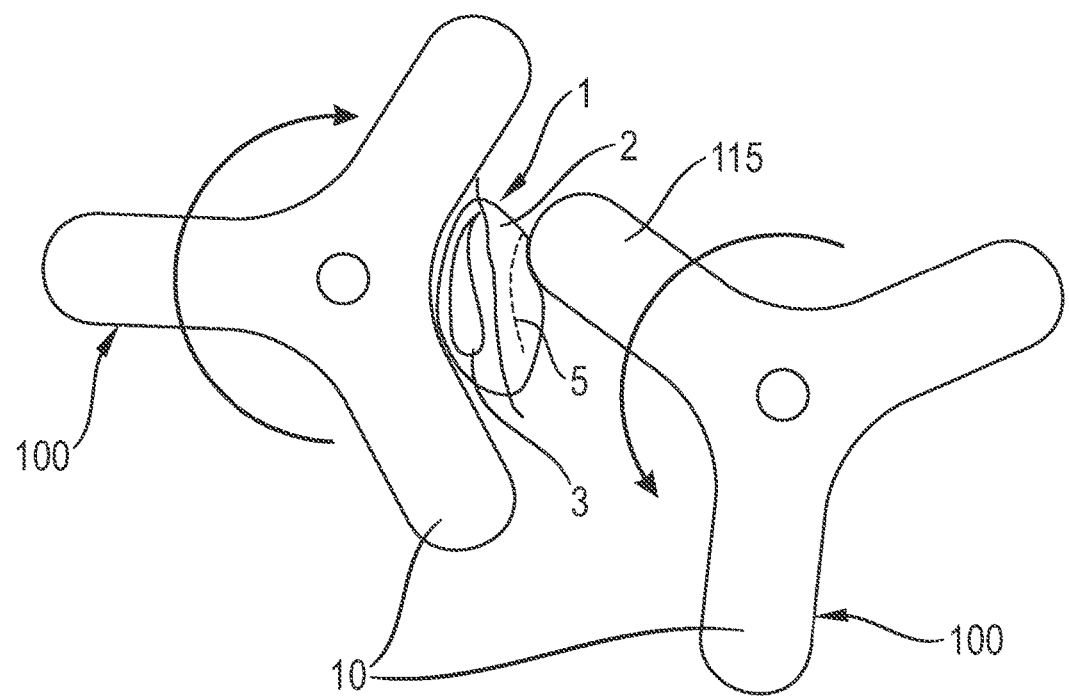
FIG. 6 illustrates an alternative perforating device.

FIG. 6 illustrates an alternative perforating device, comprising interlocking star wheels (100) and (110), which perforate the first compartment (2) of the unit dose article (1) using blunt force, while the second compartment (3) remains intact. To aid perforation, the water-soluble film of the first compartment (2) comprises a series of score marks which form a line of weakness (5).

DETAILED DESCRIPTION OF THE INVENTION

The process of the present invention solves the problem of recycling the contents of multi-compartment unit dose articles, especially those that contain incompatible ingredients. This is achieved by perforating and emptying one compartment of the unit dose article while avoiding cross-contamination from the contents of the other compartments. In addition, since cross-contamination between the compartment contents is avoided, the recycled contents can be combined into "fresh" unit dose articles, at higher levels without resulting in incompatible ingredients being combined into a single compartment.

As used herein, the phrase "machine direction" refers to the direction that the unit dose articles are moving in the process. As used herein, the phrase "cross direction" refers to a direction perpendicular to the machine direction.

All percentages, ratios and proportions used herein are by weight percent of the composition contained within the respective unit dose compartment, unless otherwise specified.

All measurements are performed at 25° C. unless otherwise specified.

Multi-Compartment Unit Dose Article:

Multi-compartment unit dose articles (1), the contents of which can be recycled using the process of the present invention, comprise a water-soluble film which fully encloses a first compartment (2), a second compartment (3), and optionally further compartments. A composition is contained within each of the compartments. The compartments of the unit dose article (1) may be the same shape and internal volume. Alternatively the compartments of the unit dose article (1) may have different shapes, and different internal volumes.

Such multi-compartment unit dose articles (1) include: products for treating fabrics, hard surfaces and any other surfaces in the area of fabric and home care, including: dishwashing, laundry cleaning, laundry and rinse additives, and hard surface cleaning including floor and toilet bowl cleaners. Particularly preferred embodiments of such multi-compartment unit dose articles include those having at least one compartment comprising a "fluid laundry treatment composition" or an "automatic dish washing composition".

As used herein, "fluid laundry treatment composition" refers to any laundry treatment composition comprising a fluid capable of wetting and treating fabric e.g., cleaning clothing in a domestic washing machine. As used herein, "automatic dish washing composition" refers to any treatment composition comprising a fluid capable of wetting and treating dishes, other crockery, pots, pans, and the like, in an automatic dish washing machine.

The compartments of the multi-compartment unit dose articles (1) can be side by side, for instance, joined by a length of water-soluble film. Preferably, the second compartment (3) and any further compartments are superimposed on the first compartment (2). For instance, where the multi-compartment unit dose article (1) comprises a first compartment (2), a second compartment (3) and a third compartment (4), the third compartment (4) may be superimposed on the second compartment (3), which is in turn superimposed on the first compartment (2) in a sandwich configuration. In more preferred embodiments, the second compartment (3), third compartment (4), and optional subsequent compartments, are all superimposed on the first compartment (2).

In a preferred embodiment the multi-compartment unit dose article (1) comprises three compartments consisting of a large first compartment (2), and smaller second compartment (3) and third compartment (4). The second compartment (3) and third compartment (4) are superposed on the larger first compartment (2). The size and geometry of the compartments are chosen such that this arrangement is achievable.

The geometry of the compartments of the multi-compartment unit-dose article (1) may be the same or different. In a preferred embodiment the first compartment (2) is the largest compartment having two large faces sealed around the perimeter. The second compartment (3) and third compartment (4), and any further compartments are smaller covering less than 75%, more preferably less than 50% of the surface area of one face of the first compartment (2). In embodiments wherein the multi-compartment unit dose article (1) comprises three compartments, the second compartment (3) and third compartment (4) can cover less than 60%, more preferably less than 50%, even more preferably less than 45% of the surface area of one face of the first compartment (2). In an alternative embodiment, the second compartment (3) and third compartment (4) are on different faces of the first compartment (1).

The thickness of the first compartment (2) is preferably at least 30%, more preferably 50%, even more preferably 60%, most preferably 75% of the thickness of the multi-compartment unit dose article (1) at the position where the thickness of the multi-compartment unit dose article (1) is a maximum.

Water-Soluble or Dispersible Film:

The compartments are formed by encapsulating the contents in a water-soluble film. The water-soluble or dispersible film typically has a solubility of at least 50%, preferably at least 75%, more preferably at least 95%. The method for determining water-solubility of the film is given in the Test Methods. The water-soluble or dispersible film typically has a dissolution time of less than 100 seconds, preferably less than 85 seconds, more preferably less than 75 seconds, most preferably less than 60 seconds. The method for determining the dissolution time of the film is given in the Test Methods.

Preferably, the water-soluble or dispersible film comprises: polymers, copolymers or derivatives thereof, including polyvinyl alcohols (PVA), polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatine, natural gums such as xanthum and carragum. Examples of suitable water soluble films are sold by Monosol of Merrillville, Ind., US, under the brand name: M8900 and M8630.

Compositions Contained within the Compartments:

The compositions comprised within the compartments of the multi-compartment unit dose article (1) may be in any suitable form: liquid, solid, or anything in between. For instance, the composition may be a powder, tablet, or a non-aqueous liquid composition. The term liquid comprises free-flowing fluids, pastes, waxy or translucent gels, and mixtures thereof. As used herein, "non-aqueous liquid composition" refers to any liquid composition comprising less than 20%, preferably less than 15%, more preferably less than 12%, most preferably less than 8% by weight of water. The non-aqueous composition of the present invention may also comprise from 2% to 40%, more preferably from 5% to 25% by weight of an organic solvent. Preferred non-aqueous solvents include monohydric alcohols, dihydric alcohols (such 1,2-propanediol or 1,3-propanediol), polyhydric alcohols, glycerol, and mixtures thereof. Non-aqueous liquid compositions may also comprise a separate solid phase, in suitably subdivided form.

While the composition within the first compartment (2), the first composition, can have any of the above forms, the first composition is preferably a powder composition or a non-aqueous liquid composition. More preferably, the first composition is non-aqueous liquid composition. The compositions within the second compartment (3) and optional further compartments are preferably non-aqueous liquids, solids, or mixtures thereof. In a preferred embodiment, the first compartment (2), second compartment (3), and any further compartments, comprises a non-aqueous liquid composition.

The ratio of the weight of the composition contained within the first compartment (2), to the weight of the composition contained within the second compartment (3) and any further compartments is preferably from 1:1 to 20:1, more preferably from 2:1 to 10:1. Where the unit dose article (1) comprises a first compartment (2), second compartment (3), and a third compartment (4), the weight ratio of the composition of the second compartment (3) to the composition of the third compartment (4), if present, is from 1:5 to 5:1, more preferably 1:2 to 2:1, most preferably from 0.8:1 to 1:0.8.

In preferred embodiments, such as multi-compartment unit dose articles (1) suitable for laundry or hard surfaces such as dishes, floor surfaces, bathroom surfaces, and kitchen surfaces, the first composition is a detergent composition, preferably a powder detergent composition or a non-aqueous liquid detergent composition. More preferably, the first composition is a non-aqueous liquid detergent composition. Suitable detergent compositions comprise from 1% to 70%, preferably from 10% to 50%, and more preferably from 15% to 45% by weight of a surfactant selected from the group consisting of: an anionic surfactant, nonionic surfactant, and mixtures thereof.

For multi-compartment unit dose articles (1) suitable for laundry applications, at least one compartment of the multi-compartment unit dose article may include conventional laundry detergent ingredients selected from the group consisting of: additional anionic and nonionic surfactants; other surfactants such as cationic, zwitterionic, amphiphilic surfactants, and mixtures thereof; enzymes; enzyme stabilizers; cleaning polymers, including: amphiphilic alkoxylated grease cleaning polymers, clay soil cleaning polymers, soil release polymers, and soil suspending polymers; bleaching systems; optical brighteners; hueing dyes; particulate material; perfume and other odour control agents; hydrotropes; suds suppressors; fabric care benefit agents; pH adjusting agents; dye transfer inhibiting agents; preservatives; non-fabric substantive dyes and mixtures thereof.

The construction of the multi-compartment unit dose article (1) provides benefits in terms of aesthetic appeal. However, the main benefit of said construction is the ability to separate otherwise incompatible ingredients. For instance, hueing dyes are effective in providing a whiteness benefit, but result in the composition appearing very dark. This is unappealing to the consumer and may even, albeit erroneously, suggest that the composition might stain the fabric being washed. Hence, hueing dyes are preferably added into a separate compartment from the first compartment (2). In a particularly preferred unit dose article, the first composition comprises a pearlescent agent which not only provides a pearlescent effect to the first composition, but also lightens the composition comprising the hueing dye, comprised in the second compartment (3) or in a further compartment, which is overlaid on top of the first compartment (2).

Cationic species, such as cationic polymers for providing fabric care benefits such as softness, are incompatible with an overtly anionic composition. Hence, they are preferably added into a second, third, or subsequent compartment, separate from a detergent composition. The compartment comprising the cationic species preferably comprises negligible levels of anionic surfactant, which provide no meaningful, or noticeable, cleaning benefit.

Bleaching ingredients are difficult to formulate into liquid compositions, since they degrade other ingredients, such as enzymes, or are themselves unstable in the present of other ingredients. Hence, bleaching ingredients, if present, are preferably comprised in compartments, separate from ingredients which are incompatible with bleach ingredients.

Process for Emptying the Contents of a First Compartment of a Multi-Compartment Unit Dose Article:

In the process of the present invention, the first compartment (2) is opened while avoiding opening the second compartment (3) or any further compartment. Thus, the first compartment (2) can be emptied while avoiding cross contamination from the contents of the second compartment (3) or any further compartments. Since the composition that is removed from the first compartment (2) is not contaminated by the contents of any other compartment, it can be added at a higher level, to the composition that will form the contents of a "fresh" unit dose article, without resulting in off-specification product.

The process of the present invention, for recycling the contents of at least one compartment of a multi-compartment unit dose article (1), having a first compartment (2), and at least a second compartment (3), formed by encapsulating the contents of the compartments with a water-soluble film, comprises at least the following steps:

(a) orienting the unit dose article, wherein the unit dose article (1) is oriented relative to a perforating device (10), such that at least a portion of the first compartment (2) faces the perforating device (10); and (b) opening the first compartment (2), wherein the water-soluble film encapsulating the first compartment (2) is perforated by the perforating device (10), to form an opened compartment, without opening the second compartment (3) or any further compartment.

Orienting the Unit Dose Article:

Any suitable means can be used to orient the unit dose article (1) relative to the perforating device (10), such that at least a portion of the first compartment (2) faces the perforating device (10). Generally, either the unit dose article (1) is rotated to position at least part of the first compartment (2) to face the perforating device (10), or the perforating device (10) is moved to face at least part of the first compartment (2). One method of orienting the unit dose article (1) is to transition the unit dose article (1) from a conveyor, preferably having an angle of from 70° to 0°, more preferably from 45° to 15°, even more preferably from 20° to 40° to the horizontal axis, in the machine direction, to an essentially vertically oriented conveyor which comprises a gap between two opposing vertically oriented transport belts, such that the unit dose article is held between the two opposing belts (for example, see FIGS. 2 and 3). When essentially vertical, the path of the unit dose article, when held between the opposing belts, is at an angle of less than 25°, preferably less than 15°, more preferably less than 5° to the vertical axis. During the aforementioned transition, the unit-dose article rolls so that the first compartment (2) is facing the perforating device (10).

Alternatively, the unit dose article (1) can be held between two surfaces which can be rotated to change the orientation of the unit dose article. The two surfaces can be stationary. Alternatively, the two surfaces can be moving, such as the surfaces of two parallel transport belts, with the unit dose article (1) held between the two belts. With such a configuration, the unit dose article (1) can be rotated about an axis in the machine direction, by rotating one end of the conveyor to introduce a twist in the belts.

Alternatively, the means of orienting the multi-compartment unit dose article (1), such that the first compartment (2) faces the perforating device, can comprise a means of rotating the perforating device (10), such that the perforating device (10) is adjacent to the first compartment (2). For instance, the perforating device (10) can be mounted on a rail or rotating arm, such that it can be rapidly moved from one side of the unit dose article (1) to the other.

Alternatively, a first perforating device (10) and a second perforating device (2) can be used in conjunction, with both being mounted in the cross direction to the flow of the unit dose article (1) passing in between. In such a configuration, either the first perforating device (10) or second perforating device (20) is brought sufficiently close to intersect the first compartment (2), such that it perforates the first compartment (2) without penetrating any other compartment. If the first perforating device (10) and second perforating device (20) are mounted such that the distance between the perforating devices remains constant, then moving one perforating device closer to the unit dose article (1) automatically results in the other perforating device being moved away from the unit dose article (1). Such a configuration can be achieved by mounting the perforating devices on to the same rail or block (30) (see FIG. 4).

If the distance between the perforating devices is sufficiently large, the perforating devices can even be positioned such that no compartments are perforated. For instance, when a different unit dose article, for instance of a different colour, passes between the perforating devices, it is desirable not to perforate the unit dose article.

Alternatively, the perforating devices can be actuated separately.

Opening the First Compartment:

The multi-compartment unit dose article (1) is transported to the perforating device (10) using any suitable means. A preferred means is to grip the unit dose article in a conveyor (70) comprising two sets of moving surfaces, preferably moving transport belts (40) and (50). When used, such conveyors should comprise a gap through which the perforating device (10), or optional second perforating device (20), can pass to intersect the first compartment (2) of the unit dose article (1). Such transport means are preferred since they can be used to accurately place the unit dose article (10) in the correct position for the perforating device (10) or optional second perforating device (20), while minimizing the risk that the unit dose article (1) can either rotate or shift out of position. The moving surfaces can be oriented at any suitable angle, though essentially horizontal or vertical orientations are preferred, in order to reduce the likelihood of the unit dose article (1) slipping out of position. When essentially vertical, the path of the unit dose article, when held between the opposing belts, is at an angle of less than 25°, preferably less than 15°, more preferably less than 5° to the vertical axis. When essentially horizontal, the path of the unit dose article, when held between the opposing belts, is at an angle of less than 25°, preferably less than 15°, more preferably less than 5° to the horizontal axis. In more preferred embodiments, the moving surfaces are oriented essentially vertically.

In the opening step, the water-soluble film which forms the first compartment (2) is perforated by a perforating device (10), or optionally a second perforating device (20), to form a perforated unit dose article, having an opening in said first compartment. Any suitable means of perforating the water-soluble film can be used.

The perforating device (10) and, if present, the second perforating device (20) may be stationary, with the first compartment (2) of the unit dose article (1) being moved against the perforating device (10) in the machine direction (see FIG. 3). Alternatively, the perforating device (10) and, if present, second perforating device (20) may be moving. The perforating device (10) and, if present, second perforating device (20), is preferably moving in the same direction as the unit dose article (1), in order to minimise rotation of the unit dose article (1) while they are being perforated by the perforating device. Alternatively, either perforating device can be made to intersect with the first compartment (2) while moving in a direction opposite to the machine direction, or even in the cross-direction.

The perforating device (10), or, if present, the second perforating device (20), can penetrate the first compartment (2) to a depth of from 5% to 95%, preferably from 5% to 25%, more preferably from 10% to 15% of the maximum thickness of the first compartment (2).

In a preferred embodiment, the perforating device (10), and any second perforating device (20), is a blade, preferably a disc blade. More preferably, the perforating device (10), and any second perforating device (20), is a rotating disc blade. Such rotating disc blades are typically motorised, and can operate in the range of from 1 to 1000 rpm (revolutions per minute), preferably from 100 to 350 rpm, more preferably from 150 to 250 rpm. If used, the blade preferably has a smooth edge, though serrated edge blades can also be used.

In an alternative embodiment, a blunt perforating device (10) can be used to perforate the water-soluble film. In such embodiments, the blunt perforating device (10) is pressed against at least one side of the first compartment (2) and pressure is applied until the first compartment (2) ruptures. Embodiments of such processes, whereby a blunt perforating device (10) is used, are particularly effective when the first compartment (2) has lower burst strength than the other compartments of the multi-compartment unit dose article (1). A lower burst strength can be achieved by: enclosing at least part of the first compartment (2) in a water-soluble film having a lower tensile strength, by incorporating a seam into the water-soluble film of the first compartment (2), by introducing a line of weakness into the water-soluble film of the first compartment (2), by having a first compartment (2) which is larger than the other compartments, and mixtures thereof.

Suitable blunt perforating devices (10) include any device that can cause the first compartment to rupture, without directly applying a cut or a hole in the water-soluble film. That is, the water-soluble film is primarily perforated by the increase in pressure in the first compartment (2).

A suitable embodiment of a blunt perforating device is a combination of a first star wheel (100) and a hard surface, such as a transport belt, wherein the minimum distance between the star wheel (100) and the hard surface is sufficient to perforate the first compartment (1) without penetration any other further compartment.

Another suitable embodiment of a blunt perforating device is a combination of a first star wheel (100) and a second star wheel (110), wherein the minimum distance between the first star wheel (100) and the second star wheel (110) is sufficient to perforate the first compartment (1) without penetration any other further compartment. Such combinations of star-wheels typically rotate about parallel axes, having inter-meshing protrusions (see FIG. 5). The star wheels are dimensioned and oriented such that, when the unit dose article (1) is placed in a gap between the inter-meshing protrusions, at least one protrusion (115) presses against the first compartment (2) with sufficient force to perforate the compartment. Alternatively, the first star wheel (100) and second star wheel (110) can be synchronised, such that the respective protrusions align along one axis, with the unit-dose article squeezed between said protrusions.

During the opening step, a compression force is preferably applied to the multi-compartment unit dose article (1), in order to both stabilise the unit dose article (1) during perforation, and to maximise the proportion of the content of the first compartment (2) that is released. Any suitable means of applying said compression force can be used. For instance, compression force can be applied by squeezing the unit dose article (1) between two sets of opposing transport belts.

In all cases, the means for applying said compression force must be dimensioned such that the perforating device can contact the first compartment (2) with sufficient force to perforate the water-soluble film. However, the compression force should not be so great as to cause the perforating device (10) to penetrate a further compartment, or to burst a further compartment of the multi-compartment unit dose article. Hence, the compression force is preferably applied, such that the thickness of the unit-dose article, in the direction that the compression force is applied, is reduce by a factor of from 80% to 20%, preferably from 70% to 30%, more preferably from 65% to 45%.

Optional Steps Before the Orientation Step:

The process of the present invention may include additional steps, either before or after the orientation and opening steps. Process steps that may take place before the orientation step include:

(a) separating the unit dose articles (1);
(b) spacing the unit dose articles (1);
(c) inspecting the unit dose articles (1); and
(d) combinations thereof.

Process steps that may take place after the opening step may include:

(a) extracting the contents of the unit dose article (1);
(b) further opening and extraction steps;
(c) unit dose change over;
(d) forming a partially recycled composition;
(e) forming a partially recycled unit dose article; and
(f) combinations thereof.

The multi-compartment unit dose article (1) can be transported between the process steps using any suitable means, including on a conveyor, such as: a conveyor comprising a single transport belt, a conveyor comprising two opposing transport belts, and combinations thereof.

Separating the Unit Dose Articles:

The unit dose articles (1) are typically stored in a bulk storage container. It is desirable to separate the unit dose articles into a more ordered, unitised array. The unit dose articles can be separated by any suitable means. For instance, this can be done via mechanical hoppers which are set up to feed out individual unit dose articles (1), or via a robotic device.

A preferred means of separating the unit dose articles (1) is to dispense them from a dispensing device, such as a hopper, individually onto a first conveyor (60), such as a conveyor comprising lugs (65). The bottom of the dispensing device can be fitted with a chute (90) in order to help empty the dispensing device of unit dose articles (1), in individual fashion. Preferably, the conveyor (60) is inclined in the machine direction at an angle of from 70° to 10°, more preferably from 45° to 15°, even more preferably from 20° to 40° to the dispensing device. An incline of 30° is preferred, particularly for unit dose articles (1) comprising a liquid filled compartment.

If a lug conveyor is used, the size, geometry and separation of the lugs (65) can be selected, based on the characteristics and dimensions of the unit dose articles to be recycled. For improved separation of the unit dose articles (1), the height of the lugs (65) is preferably from 5 mm to 45 mm, more preferably from 10 mm to 20 mm. The lugs (65) can be set any suitable distance apart, though the lug spacing is preferably from 25 mm to 100 mm, more preferably from 35 mm to 80 mm, most preferably from 50 mm to 70 mm apart. To prevent the unit dose articles from falling out of the pockets formed by the lugs (65), optional side walls (68) can be positioned on either side of the lugs. When used, such walls are preferably stationary and not moving with the lugs (65).

Two or more lug conveyors can also be used in parallel, each feeding to a separate opening apparatus.

The conveying length, the length over the conveyor (60) over which the unit dose articles (1) are conveyed, is preferably from 30 mm to 2 m, more preferable from 1 m to 2 m. A longer conveying length gives more time for the unit dose article (1) to rest in the desired orientation.

In order to make it easy to separate the unit dose articles (1), the exterior surface of the unit dose articles may be lubricated. Either wet lubricants, such as a non-aminofunctional solvent, or dry lubricant can be used. Suitable dry lubricants include powders which prevent the unit-dose articles from sticking together, and also allow the unit-dose articles to easily slide apart. For instance, the unit dose articles can be dusted with zeolite powder. Lubricants comprising zeolite powder are preferred, since they are desiccants which absorb surface moisture, and prevent the unit dose articles from becoming sticky. Other examples of suitable powder lubricants can be found in WO02/26896.

A reject system can be placed at any point on the conveyor, to remove unit dose articles as needed. For instance, if more than one unit dose article (1) is contained between adjacent lugs (65). Any suitable reject system can be used. For instance, a laser beam can be used to inspect the unit dose article (1), and to signal to an air jet whether a unit dose article (1) should be expelled from the conveyor.

Spacing the Unit Dose Articles:

It may be desirable to modify the spacing between adjacent unit dose articles (1), for instance, to increase the time available for completion of subsequent process steps. For instance, the unit dose articles (1) can be passed from a slower moving first conveyor, to a faster moving second conveyor. Alternatively, the separation can be reduced by passing the unit dose articles (1) from a first conveyor on to a subsequent slower moving conveyor.

While each conveyor can comprise a single transport belt, it is preferred that each conveyor comprises two opposing transport belts, such that the unit dose article (1) is held between opposing moving surfaces. For smoother transfer, the conveyors can be oriented vertically such that the unit dose articles (1) are dropped vertically into the gap between the opposing transport belts of the subsequent conveyor.

If needed, the distance between adjacent unit dose articles can be further increased, by passing the unit dose articles onto a further subsequent, still faster moving conveyor.

Inspecting the Unit Dose Articles:

An inspection camera can be positioned at any suitable location. For instance, the inspection system can be positioned with a view over the optional first conveyor (60), positioned with a view beside an optional second conveyor (70), or set up to view in between two conveyors, such as in between a first conveyor (60) and a second conveyor (70). Suitable inspection cameras include the Cognex Insight 5200C (Cognex Corporation). Such inspection cameras can be used to check the orientation of the unit dose articles (1), in order to decide which compartment should be opened, or even to check whether the unit article (1) should be rejected instead of opened. Reasons for rejecting a unit dose article (1), instead of opening the first compartment (2), include the unit dose article (1) being a different variant from the others, or because it is already leaking.

Extracting the Contents of the Unit Dose Article:

While some of the contents of the perforated compartment are extracted during the opening step, it is desirable to increase the quantity of extracted contents of the perforated compartment. Therefore, the process of the present invention, preferably comprises a step of extracting the contents of the perforated compartment, such that the extracted contents form from 50% to 100%, preferably from 65% to 98%, more preferably from 70% to 95% by weight of the original contents of the perforated compartment. Any suitable means can be used to increase the quantity of the content of the perforated compartment that is extracted. For instance, the contents can be separated from the perforated unit dose article using a conveyor having a transport belt comprising a mesh material. The mesh openings are sized such that the perforated unit dose article, with the perforated compartment, cannot pass through, but that the extracted contents of the perforated compartment can pass through freely. The perforated unit dose article will be conveyed to the conveyor discharge, while the extracted contents drain through the belt comprising mesh material, and are collected by any suitable means.

The extracted contents of the perforated compartment can be collected in a tray, bin, or any other suitable container. The collected extracted contents can then be pumped to larger containers for further processing. For instance, the extracted contents can be combined with further ingredients to form part of the contents of a compartment of a further unit dose article. Alternatively, the extracted contents can be combined with other ingredients to form an alternative compositions, such as an aqueous, or non-aqueous, liquid laundry detergent composition.

In order to increase the contents of the perforated compartment that is extracted, pressure can be applied to the perforated unit dose article. The applied pressure is preferably sufficient to increase the amount of extracted content, while not being so high as to burst a further unit dose compartment. Pressure can be applied using any suitable method. For instance, pressure can be applied to the perforated unit dose article, by passing the perforated unit dose article between a pair of parallel rollers. The gap between the rollers is preferably set such that enough pressure is applied increase the contents of the perforated compartment that is extracted, while not bursting any further compartments. The gap between the rollers can be from 2 mm to 30 mm, and should be established based on the particular geometry of the perforated unit dose article.

Alternatively, at least one of the rollers can be spring-loaded, in order to apply pressure to the perforated unit dose article as it passed between the rollers. Typical means of spring-loading the roller include the use of a mechanical spring, hydraulic actuation, an air cylinder, or combinations thereof.

Such rollers can be separate from a conveyor, or even be part of a conveyor, such as the drive rollers of the conveyor.

In an alternative embodiment, pressure can be applied to the perforated unit dose article through the use of a conveyor comprising opposing transport belts, wherein the gap between the transport belts is set such that pressure is applied to the perforated unit dose article as it passes between the belts. The gap between the belts can vary, such that the applied pressure increases as the perforated unit dose article moves towards the conveyor discharge. Preferably, the pressure applied by the belts is not sufficient to burst any further compartments of the perforated unit dose article. In such a configuration, the lower transport belt could be the belt of the conveyor used to extract the contents, having a mesh belt.

Further Opening and Extraction Steps:

In order to extract the contents of a further compartment of the unit dose article, the opening step and extraction step may be repeated on the further compartment, whose contents are to be extracted. When the process comprises further opening and extraction steps, it is preferred that the perforated unit dose articles are washed prior to the further opening step. This can be achieved using the wash fluid and wash means described below.

Unit Dose Change Over:

It is preferable that at least part of the apparatus, used to perform the process of emptying the contents of at least one compartment of a multi-compartment unit dose article (1), is washed before a second, different, set of multi-compartment unit dose articles (1) are recycled. Through such a washing procedure, cross contamination between the extracted contents of one compartment of a first unit dose article (1) and the contents of one compartment of a second, different, unit dose article (1) is minimised.

Preferably, at least the parts of the apparatus used for the opening step and extraction step are washed before the second, different, set of multi-compartment unit dose articles (1) are recycled.

The wash fluid is selected so as to be compatible with the extracted contents of the perforated compartment, and to not dissolve the water-soluble film. Hence, the wash fluid preferably comprises less than 20 wt %, more preferably less than 10 wt %, even more preferably less than 5 wt % of water. Most preferably, the washing fluid comprises no water. Most preferably, the wash fluid is formulated using ingredients that are common between the compartments whose contents are to be extracted.

The wash fluid can be applied by any suitable means, though one or more spray nozzles are preferred. The nozzle should allow for the wash fluid to be applied with sufficient velocity, such that good cleaning is achieved. Any number of nozzles may be used and they may be placed at any suitable location within the apparatus. It is desired that these nozzles are concentrated in the area of the equipment after the opening step.

Forming a Partially Recycled Composition:

The process for recycling the contents of at least the first compartment (2) of a multi-compartment unit dose article (1) may include the step of forming a partially recycled composition, wherein the extracted contents are combined with additional ingredients. The extracted contents may form from 1% to 20%, preferably from 3% to 15%, more preferably from 5% to 15% by weight of the partially recycled composition. The extracted contents can be combined with the additional ingredients using any suitable process known in the art.

Forming a Partially Recycled Unit Dose Article:

The process for recycling the contents of at least one compartment of a multi-compartment unit dose article may further comprise a step of forming a partially recycled unit dose article, wherein the partially recycled composition is encapsulated in a water-soluble film. The partially recycled composition can be encapsulated using a water-soluble film, through any suitable process known in the art.

Apparatus for Recycling Multi-Compartment Unit Dose Articles:

The process of the present invention can be carried out on any suitable apparatus. A suitable apparatus for recycling the contents of at least one compartment of a multi-compartment unit dose article comprises: a means of orienting the multi-compartment unit dose article relative to the perforating device, such that the first compartment faces the perforating device; and a perforating device for opening the compartment without opening any further compartment.

Suitable means of orienting the multi-compartment unit dose article, such that the first compartment faces the perforating device, have been described in the section related to the orientation step, and includes the following:

(a) a conveyor, preferably comprising two sets of moving surfaces, such as transport belts, arranged such that the unit dose article (1) is held between the moving surfaces, wherein one end of the transport belt is able to twist, such that the unit dose article (1) rotates about an axis in the machine direction;

(b) a rotatable mount for the perforating device, such that the perforating device can be rotated to different sides of the unit dose article;

(c) mounting a first perforating device (10) and second perforating device (20) in the cross direction, such that either the first perforating device (10) or second perforating device (20) can be brought sufficiently close to the first compartment (2), such that it perforates the first compartment (2) without perforating the other compartments, depending on which perforating device is adjacent the first compartment (2); and (d) combinations thereof.

If the features of the apparatus for orienting the unit dose article is separate from the features that are used to open the first compartment of the unit dose article, the apparatus can comprise a means to transport the unit dose article to the parts of the apparatus used to open the first compartment. Suitable means include a conveyor comprising:

(a) a moving surface, such as a transport belt;

(b) two sets of moving surfaces, preferably two transport belts, such that the unit dose article is gripped between the two sets of moving surfaces; and (c) combinations thereof.

A suitable apparatus comprises a perforating device (10) for opening the first compartment. Suitable perforating device include:

(a) a cutter, such as a blade, preferably a circular blade, more preferably a rotating disc blade;

(b) a blunt perforating device, arranged to press against at least one side of the first compartment (1) with sufficient pressure to rupture the first compartment, such as a blunt perforating device comprising a star wheel and a hard surface, wherein the minimum distance between the star wheel and the hard surface is sufficient to perforate the first compartment (2) without penetration any other further compartment, or two intermeshing star wheels, wherein the minimum distance between the star wheels is sufficient to perforate the first compartment (1) without penetration any other further compartment; and (c) combinations thereof.

The apparatus may comprise additional elements before the features for orienting the unit dose article (1) relative to the perforating device (10). For instance:

(a) a means for separating the unit dose articles (1), such as a hopper in combination with a conveyor (60), preferably a conveyor having lugs (65);

(b) a means for inspecting the unit dose articles, such as an inspection camera or laser beam; and (c) a reject system for removing unit dose articles (1), such as unit dose articles (1) having contents which are not the same as those of the unit dose articles (1) to be recycled. Suitable reject systems may comprise an air jet to remove a unit dose article (1) from the apparatus, and can be connected to the means for inspecting the unit dose articles.

(d) a means for altering the spacing between the unit dose articles, such as a first conveyor and a subsequent second conveyor, operating at different surface speeds;

(e) combinations thereof.

The apparatus may comprise additional elements after the features for opening the unit dose article. For instance:

(a) a means for extracting the contents of the perforated compartment, such as a conveyor comprising a transport belt, the transport belt comprising a mesh material. Such a means can also incorporate a means for applying pressure to the perforated unit dose article, in order to increase the amount of extracted content from the first compartment, without bursting any further compartment;

(b) a means for opening a further compartment of the unit dose article, preferably having the same features as used to open the first compartment;

(c) a means for washing elements of the apparatus, such as suitable positioned spray nozzles, particularly for washing those elements of the apparatus used for the opening step and after; and
(d) combinations thereof.

Methods:

1) Method of Measuring the Solubility of Water-Soluble or Dispersible Films:

5.0 grams±0.1 gram of the water-soluble or dispersible film is added in a pre-weighed 400 ml beaker and 245 ml±1 ml of distilled water is added. This is stirred vigorously on a magnetic stirrer set at 600 rpm, for 30 minutes. Then, the mixture is filtered through a sintered-glass filter with a pore size of maximum 20 microns. The water is dried off from the collected filtrate by any conventional method, and the weight of the remaining material is determined (which is the dissolved or dispersed fraction). Then, the percentage solubility or dispersibility can be calculated.

2) Method of Measuring the Dissolution Time of Water-Soluble or Dispersible Films:

The film is cut and mounted into a folding frame slide mount for 24 mm by 36 mm diapositive film, without glass (part number 94.000.07, supplied by Else, The Netherlands, however plastic folding frames from other suppliers may be used).

A standard 600 ml glass beaker is filled with 500 ml of city water at 10° C. and agitated using a magnetic stirring rod such that the bottom of the vortex is at the height of the 400 ml graduation mark on the beaker.

The slide mount is clipped to a vertical bar and suspended into the water, with the 36 mm side horizontal, along the diameter of the beaker, such that the edge of the slide mount is 5 mm from the beaker side, and the top of the slide mount is at the height of the 400 ml graduation mark. The stop watch is started immediately the slide mount is placed in the water, and stopped when the film fully dissolves. This time is recorded as the "film dissolution time".

EXAMPLES

Example 1

Multi-compartment unit dose articles, of the form of FIG. 1, were prepared. The unit dose articles consisted of: a first compartment comprising 25 ml of a non-aqueous liquid detergent composition, a second compartment comprising 1.8 ml of a non-aqueous liquid detergent and a hueing dye, and a third compartment comprising 1.8 ml of a non-aqueous liquid detergent and a different non-fabric substantive dye. The uncompressed thickness of the multi-compartment unit dose article was 30 mm, while the uncompressed thickness of the first compartment was 25 mm.

The unit dose articles were fed from a hopper, via a chute, into a first conveyor comprising lugs, and stationary sidewalls. The first conveyor was inclined at an angle of +35° to the horizontal in the machine direction. The first conveyor fed the unit dose articles to a vertically oriented second conveyor, comprising two opposing transport belts. Upon rolling off the first conveyor, into the gap between the belts of the second conveyor, the unit dose articles oriented such that the first compartment contacted one of the belts of the second conveyor. The spacing between the unit dose articles was increased by feeding the unit dose articles into a third conveyor, also comprising two opposing transport belts, having a surface speed of three times that of the second conveyor. The gap between the transport belts of the third conveyor was set to 25 mm, resulting in a reduction in the thickness of the unit-dose article of 17%. An inspection camera was positioned to view in between the belts of the third conveyor, and used to position either a first perforating device, or a second perforating device, to intersect with the first compartment to a depth of 5 mm. The perforating devices were individually actuated. Immediately after perforation, the distance between the belts of the third conveyor was reduced to 15 mm, in order to further compress the perforated unit dose article, and increase the quantity of the contents of the first compartment, that was removed. The perforated unit dose article is then passed to a fourth conveyor, comprising a mesh belt. The contents of the perforated first compartment were collected.

Using the above process and apparatus, 73 wt % of the contents of the first compartments of the unit dose articles was collected, and recycled into "fresh" unit dose articles at a level of 4.9% of the contents of the unit dose compartment.

Example 2a, and 2b

The following examples disclose dual compartment unit-dose laundry detergent articles, encapsulated in a polyvinyl alcohol film, comprising an activated peroxygen source is in a separate compartment from the other laundry ingredients, the contents of which can be recycled using the process and apparatus of the present invention.

| | Example 2a | | Example 2b | |
|---|---|---|---|---|
| Ingredient name | First compartment 32 g WT % | Second compartment 4 g WT % | First compartment 32 g WT % | Second compartment 4 g WT % |
| Linear alkyl benzene sulfonic acid | 26.0 | — | 27.0 | — |
| Phthalimido peroxycaproic acid (PAP)[3] | — | 33.33 | — | 33.33 |
| C12-14 alkyl ethoxy 3 sulphate MEA salt | 2.0 | — | — | — |
| Sulphuric acid mono-[2-(3,4-dihydro-isoquinolin-2-yl)-1-(2-butyl-octyl-oxymethyl)-ethyl] ester, internal salt | 0.06 | — | — | — |
| N-methyl-3,4-dihydroisoquinolinium tetrafluoroborate | — | — | 0.05 | — |
| C12-14 alkyl 7-ethoxylate | 15.0 | — | 20.0 | — |
| C12-18 Fatty acid | 18.0 | — | 20.0 | — |
| Enzymes[2] | 2.3 | — | 2.3 | — |
| PEG-PVAc polymer | 2.0 | — | — | — |
| Buffer (Monoethanol amine) | To pH 8.8 | — | To pH 8.7 | — |
| Solvent | 18.6 | — | 20.6 | — |
| Mineral Oil | — | To 100 | — | To 100 |
| Colour | 0.008 | — | 0.008 | — |
| Water | 9.0 | — | 5.0 | — |
| Miscellaneous/Minors | To 100 | — | To 100 | — |

[2]Amylase and protease
[3]Eureco W ™, supplied by Solvay, Aussimont

Example 3

The following example discloses a dual compartment unit-dose laundry detergent article, encapsulated in a polyvinyl alcohol film. The first composition comprises a non-aqueous liquid detergent composition which does not comprise a dye. The second composition comprises a non-aqueous liquid detergent composition which comprises a violet hueing dye. The contents of the first compartment can be recycled using the process of the present invention, while avoiding discoloration from the hueing dye contained within the second compartment.

|  | Example 3 | |
| --- | --- | --- |
|  | First compartment 32 g | Second compartment 4 g |
| Ingredient name | WT % | WT % |
| Linear $C_9$-$C_{15}$ Alkylbenzene sulfonic acid | 18.5 | 18.5 |
| $C_{12-14}$ alkyl 9-ethoxylate | 14.6 | 14.6 |
| Citric Acid | 0.6 | 0.6 |
| Top palm kernel fatty acid | 6.0 | 6.1 |
| C12-14 alkyl ethoxy 3 sulfate | 8.5 | 8.6 |
| Chelant | 0.6 | 0.6 |
| Sodium hydrogen sulfite | 0.4 | 0.1 |
| Polymer | 6.0 | 6.0 |
| Enzymes | 2.0 | 0.0 |
| Hydrogenated castor oil | 0.15 | 0.15 |
| Perfume | 1.8 | 0.0 |
| Propanediol | 15.0 | 16.0 |
| Glycerol | 5.0 | 6.0 |
| Water | 10.0 | 10.0 |
| Liquitint ® Violet CT Hueing Dye | — | 0.01 |
| Buffer (Monoethanol amine) | to pH 7.4 | to pH 7.4 |
| Additives, Minor | To 100% | To 100% |
| Linear $C_9$-$C_{15}$ Alkylbenzene sulfonic acid | 18.5 | 18.5 |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for recycling contents of at least one compartment of a multi-compartment unit dose article (1) having a first compartment (2), at least a second compartment (3), and contents comprising a fluid laundry treatment composition or an automatic dish washing composition, said unit dose article (1) formed by encapsulating the contents of the compartments with a water-soluble film, wherein the process comprises the steps of:

(a) orienting the unit dose article (1), wherein the unit dose article (1) is oriented relative to a perforating device (10), such that at least a portion of the first compartment (2) faces the perforating device (10); and (b) opening the first compartment (2), wherein the water-soluble film encapsulating the contents of the first compartment (2) is perforated by the perforating device (10) to form a perforated first compartment, without perforating any further compartment of the unit dose article (1).

2. The process according to claim 1, wherein the perforating device (10) is a blade.

3. The process according to claim 2, wherein the blade is a rotating disc blade.

4. The process according to claim 1, wherein the perforating device (10) penetrates the first compartment (2) to a depth of from about 5% to about 95% of a maximum thickness of the first compartment (2).

5. The process according to claim 4, wherein the perforating device (10) penetrates the first compartment (2) to a depth of from about 5% to about 25% of the maximum thickness of the first compartment (2).

6. The process according to claim 5, wherein the perforating device (10) penetrates the first compartment (2) to a depth of from about 5% to about 15% of the maximum thickness of the first compartment (2).

7. The process according to claim 1, wherein the unit dose article (1) has an exterior surface, wherein the exterior surface of the unit dose article is lubricated.

8. The process according to claim 1, wherein the process further comprises a step of extracting the contents of the perforated first compartment, such that the extracted contents form from about 50% to about 100% by weight of the original contents of the perforated first compartment.

9. The process according to claim 8, wherein the process further comprises a step of extracting the contents of the perforated first compartment, such that the extracted contents form from about 65% to about 98% by weight of the original contents of the perforated first compartment.

10. The process according to claim 9, wherein the process further comprises a step of extracting the contents of the perforated first compartment, such that the extracted contents form from about 70% to about 95% by weight of the original contents of the perforated first compartment.

11. The process according to claim 10, wherein the process further comprises a step of forming a partially recycled composition, wherein the extracted contents are combined with additional ingredients to form the partially recycled composition.

12. The process according to claim 11, wherein the extracted contents form from about 1% to about 20%, preferably from about 3% to about 15%, more preferably from about 5% to about 15% by weight of the partially recycled composition.

13. The process according claim 11, further comprising a step of forming a partially recycled unit dose article, wherein the partially recycled composition is encapsulated in a water-soluble film.

14. The process according to claim 12, further comprising a step of forming a partially recycled unit dose article, wherein the partially recycled composition is encapsulated in a water-soluble film.

15. The process according to claim 8, further comprising a unit dose change over step, wherein at least part of an apparatus used to perform the step of extracting the contents of the first perforated compartment of a multi-compartment unit dose article, is washed before a second, different, set of multi-compartment unit dose articles is recycled.

16. The partially recycled composition formed by the process according to claim 11.

17. The partially recycled composition formed by the process according to claim 12.

18. The partially recycled unit dose article formed by the process according to claim 13.

19. The partially recycled unit dose article formed by the process according to claim 14.

* * * * *